March 22, 1966 C. L. RANK ETAL 3,241,976
APPARATUS FOR FORMING AND APPLYING A MIXTURE ONTO A SURFACE
Filed April 26, 1965 2 Sheets-Sheet 1

INVENTORS
CARLETON L. RANK &
WILLIAM J. KAUTH
BY
Gardner & Zimmerman
ATTORNEYS

United States Patent Office 3,241,976
Patented Mar. 22, 1966

3,241,976
APPARATUS FOR FORMING AND APPLYING
A MIXTURE ONTO A SURFACE
Carleton L. Rank, 1199 Upper Happy Valley Road, Lafayette, Calif., and William J. Kauth, Santa Rosa, Calif.;
said Kauth assignor to said Rank
Filed Apr. 26, 1965, Ser. No. 450,904
6 Claims. (Cl. 94—44)

The present invention relates to the production of a mixture of a material and a liquid such as a paste, slurry or solution and, more particularly, to the production of such a mixture simultaneously with a uniform application thereof to a base surface.

The desired layer of lime or cement is sometimes applied to the soil by laying a windrow of the material onto the soil and spreading it from the windrow over the area to be hardened. There are many instances in which it is desirable to be able to apply a uniform layer of a particulate material onto a base surface. For example, such a layer is commonly applied to the ground or other base in the construction of traffic bearing surfaces such as highways and streets. That is, a layer of lime or cement is often applied onto the soil over which the traffic surface is to be built. This layer is then mixed with the underlying soil and water is added. The resulting mixture hardens into a stabilized, solid base or sub-base for the traffic bearing surface. However, as is known, both lime and cement are generally in the form of a fine powder. Therefore, during the laying of the windrow and the spreading of the material therefrom, much of it becomes airborne. This results in a very dusty operation and substantial material being wasted. In addition, both lime and cement are irritants, and the dust formed when the lime is applied in this manner irritates the skin and eyes of workmen or other people in the area. Further, it is very difficult to get a uniform layer of the powder onto the soil by this method, and therefore the resultant base is not of a uniform hardness.

Because of the above disadvantages, the powder is sometimes applied to the soil surface in the form of a water slurry. However, such a slurry cannot contain more than 1% lime or cement or it will have too high of a viscosity for handling by the usual application apparatus. Thus, there is a limitation on the amount of such material that can be applied in a given area without repeating the application operation. In addition high and low spots in the ground area over which the slurry is applied results in a non-uniform layer thereof. Further, this method, besides requiring a slurry application apparatus, requires relatively expensive mixing equipment to make the slurry. Since such equipment should be portable in order that it can be moved as the construction proceeds, the size and thus, the slurry making capacity thereof is generally limited. For the above reasons, the slurry method of applying cement or lime to the ground has not been entirely satisfactory nor completely accepted as a substitute for applying the material directly as a powder to the soil.

It is accordingly an object of the present invention to provide an improved method and apparatus for applying a uniform layer of a material onto a base surface.

Another object of the invention is to provide a method and apparatus for forming a mixture of a material and a liquid simultaneously with the application of such mixture to a base surface.

A further object of the invention is to provide a method and apparatus for forming a mixture of a material and a liquid of a desired consistency and applying such mixture onto a base surface.

Still another object of the invention is to provide a liquid and particulate material mixture forming and dispensing apparatus on a vehicle having means for containing a supply of the particulate material from which the mixture is to be formed.

One other object of the present invention is to provide apparatus on a vehicle for producing a mixture of a liquid and a particulate material and applying such mixture onto a base surface as the vehicle travels over such base surface.

A still further object of the invention is to provide a vehicle having means for containing a supply of particulate material and means for making a mixture of such material and a liquid and applying the mixture to a base surface over which the vehicle travels so as to provide a uniform amount of such material onto the base surface regardless of variations in the speed of the vehicle over the surface.

The invention possesses other objects and features of advantage, some of which with the foregoing, will be set forth in the following description of a preferred form of the invention which is illustrated in the drawings accompanying and forming part of the specification. It is to be understood however that variations in the showing made by the drawings and description may be adopted within the scope of the invention as set forth in the claims.

Referring to the drawings.

Figure 1:
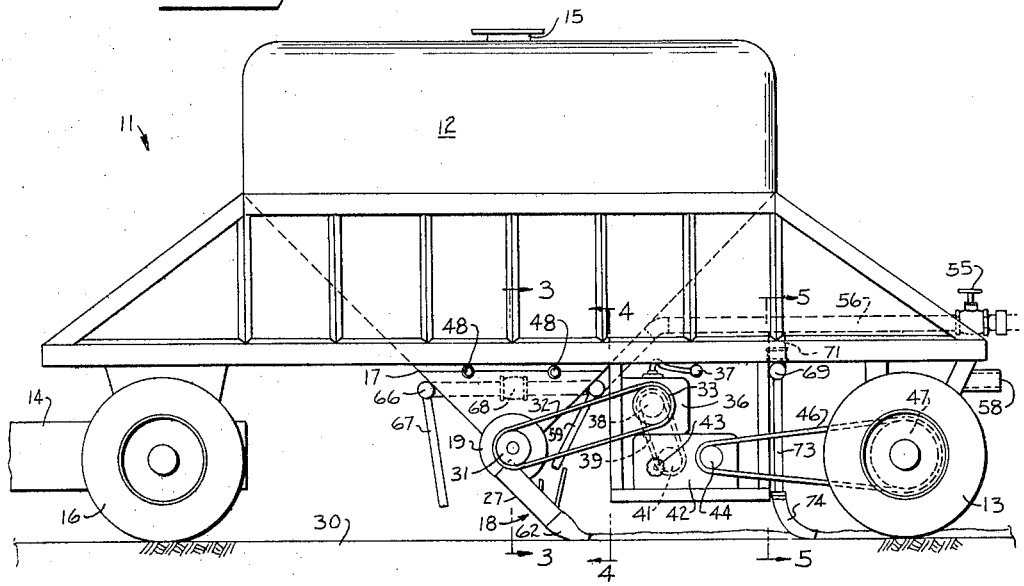
FIGURE 1 is a side elevation view of a vehicle in the form of a towable trailer which includes the mixture forming and applying apparatus of the invention.

As set out above, the apparatus of the invention includes apparatus for forming and applying a mixture of a liquid and a material. Such apparatus is mounted on a vehicle such as a trailer, which has a containment means for the material from which the mixture is to be made. As the vehicle travels over the surface onto which the mixture is to be applied or dispensed, the apparatus simultaneously forms the mixture and applies it to the surface. Because of this simultaneous formation and application of the mixture, the mixture can be of any desired consistency. Further, the apparatus correlates the amount of material provided in the mixture with the speed of the vehicle over the surface to provide a uniform amount of the material to the surface irrespective of variations in the speed of the vehicle.

Referring to the drawing, there is shown a trailer, generally indicated by the reference numeral 11, having a particulate material containment tank 12 which is enclosed to prevent adverse weather from affecting powder therein. Trailer 11 is of the so-called semi-type. That is, it has a set of wheels 13 at its rear end, and is adapted at its front end to be supported by a pulling tractor 14 (partly shown) having rear wheels 16.

Tank 12 has an inlet suitably provided thereon to permit a particulate material, such as lime, to be air fed into the tank. An air outlet 15 is provided through the top of the tank, and is adapted to have a straining bag attached thereto. As the tank is filled with material, the feed air escapes through outlet 15. Any material entrained with the air is separated therefrom by the bag and falls back into the tank.

It is to be appreciated that rather than having a pulling tractor 14, a truck having a second material containment tank can be utilized to pull trailer 11. With such an arrangement, the inlet of the trailer containment tank can be suitably connected to an outlet of the tank on the truck. Then, material can be fed from the truck to the tank whenever the amount of material within the trailer tank reaches a predetermined low level.

Containment tank 12 has a generally V-shaped bottom wall 17, and adjacent the point or bottom of the V, mixture forming and dispensing apparatus generally indicated by 18. Such apparatus 18 includes means for metering a predetermined amount of particulate material for forming the mixture. More particularly, a drum 19 extends transversely across containment tank 12 at the bottom or point of V-shaped wall 17 and is suitably supported for rotation about its longitudinal axis by bearings 21 (FIGURE 3) adjacent its ends. Drum 19 has a plurality of equally spaced apart slats or paddles 22 extending radially outward and longitudinally thereof. Annular stationary guide members 23 surround drum 19 and paddles 22 at spaced points therealong in order to uniformly distribute material along the length of the drum.

Figure 2:
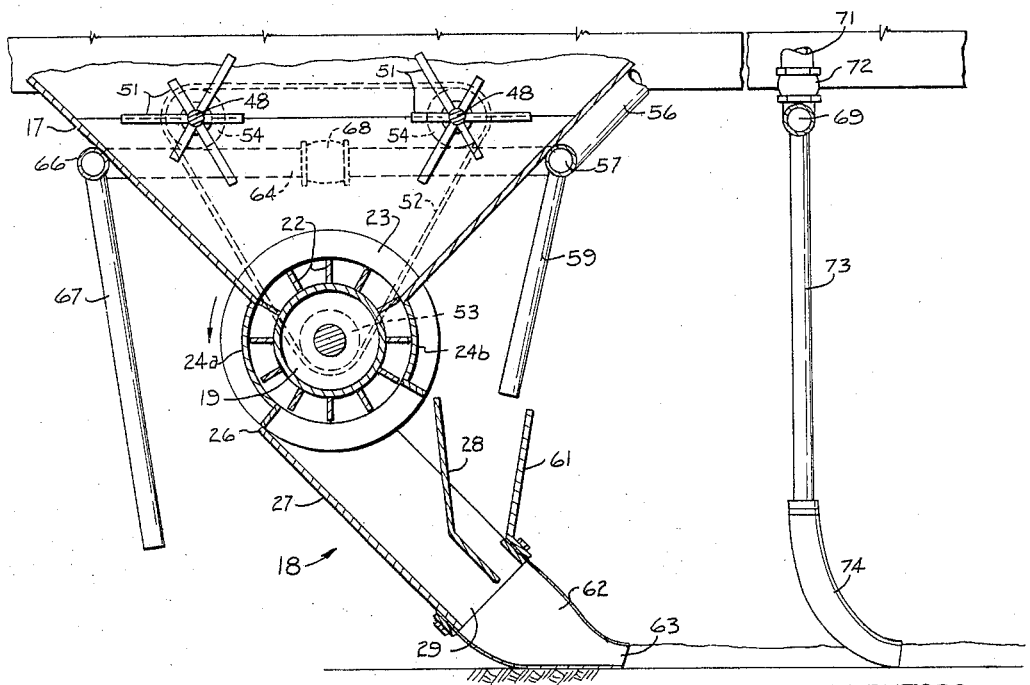
FIGURE 2 is a cross sectional view on an enlarged scale of a portion of the mixture forming and applying apparatus of FIGURE 1, illustrating the mechanism thereof.

As is best illustrated in FIGURE 2, bottom wall 17 of tank 12 terminates in arcuate wall sections 24a and 24b which fit closely about the sides of drum 19 contiguous with slats 22. Thus it can be seen that a powdered or particulate material within tank 12 can only escape from the bottom of such tank if drum 19 is rotated. That is, if drum 19 is stationary, it and the slats 22 thereon effectively block the opening at the point or bottom of V-shaped wall 17. However, upon rotation of drum 19, slats 22 transport any material with which they come into contact at the bottom of the tank 12 to the exterior of the tank 12 terminates in arcuate wall sections 24a and 24b tank in a manner analogous to the manner in which a water wheel picks up water. Means are provided below drum 19 to catch and direct the movement of particulate material which is metered by drum 19 to the exterior of tank 12. More particularly, a chute member 26 having a sloping bottom wall 27 extends longitudinally of the drum and is suitably connected such as by welding to arcuate wall section 24a. A top wall 28 of such chute member extends from adjacent arcuate wall section 24b to provide with bottom wall 27 a powder dispensing slot indicated at 29. It is to be appreciated that powder metered from tank 12 to the exterior thereof by rotation of drum 19 will fall onto bottom wall 28 of chute 26 and flow therealong through slot 29.

Motion transmitting mechanism is provided for rotating drum 19 and correlating the speed of rotation thereof with the speed of rotation of the trailer rear wheels 13. Such mechanism, therefore, correlates the amount of powder metered by drum 19 with the speed of movement of the trailer 11 over surface 30. More particularly, a sprocket wheel 31 is rigidly connected to one end of drum 19, and a driving chain 32 engages such wheel to transmit motion from another sprocket wheel 33 on the output shaft 34 of a transmission 36. Transmission 36 is of a conventional nature and includes a gear selector 37. The number of speed selections which transmission 36 should be able to provide will depend on the range of the different thicknesses of the dispensed material that it is desired the apparatus be able to provide. A four-speed transmission has been found to provide a suitable range for most operations.

A sprocket wheel 38 (shown in phantom in FIGURE 1) on the input shaft of the transmission is operatively connected by means of chain 39 to another sprocket wheel 41. Sprocket wheel 41 is on the output shaft of a positive, continuously variable speed transmission mechanism 42. While the earlier described transmission 36 provides a coarse control of the relationship between the amount of material dispensed by the apparatus and the speed of the trailer 11 over the surface, the continuously variable transmission 42 allows fine control over such relationship. That is, after the desired gear of standard transmission 36 is selected, hand operated knob 43 on continuously variable transmission 42 can be turned to provide the exactly desired speed relationship within the range determined by the transmission 36. One type of continuously variable speed transmission mechanism which provides the desired fine control is known as the P.I.V. transmission.

Figures 4, 5:
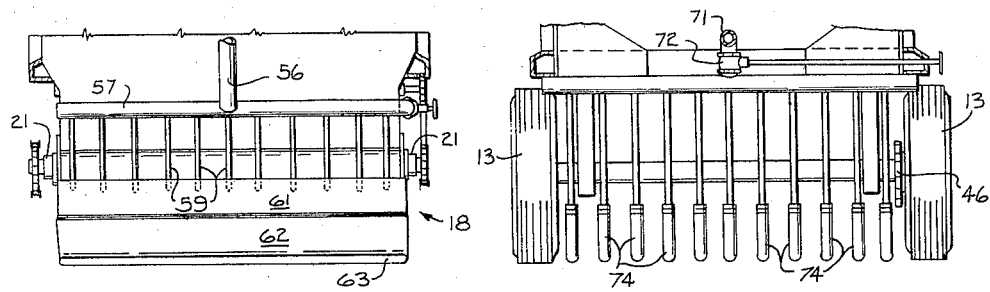
FIGURE 4 is a portional view taken substantially in the plane indicated by the line 4—4 of FIGURE 1 and illustrating the exterior of the mixture forming and applying apparatus.
FIGURE 5 is a portional view taken substantially in the plane indicated by the line 5—5 of FIGURE 1 and illustrating means for adding further liquid to a mixture after such mixture has been applied to a base surface.

To provide power to transmission 42 a sprocket wheel is connected to its input shaft. A chain 46 on such sprocket wheel passes around another sprocket wheel 47 secured for rotation with one of the wheels 13 at the inner side thereof (see FIG. 5).

From the above, the manner in which power is supplied to rotate drum 19 and meter powder into chute 36 is readily apparent. When trailer 11 is towed, wheels 13 and, therefore, sprocket wheel 47 rotate. Such rotation is transmitted from sprocket 47 by chain 46 to the input sprocket 44 of transmission 42, and from the output sprocket 41 of transmission 42 by chain 39 to the input sprocket 38 of transmission 36. From transmission 36 such rotation is transmitted to rotate drum 19 by means of sprocket 31. It can be seen that the speed of rotation of drum 19 is directly dependent on the speed of rotation of wheel sprocket 47 and, hence, the speed at which trailer 11 is towed over the surface. Thus, the amount of powder metered by drum 19 into chute 26 is directly related to the speed at which trailer 11 travels over surface 30 with more powder being metered at relatively faster speeds and less powder being metered at slower speeds.

It is to be appreciated that in many applications of the apparatus of the invention, the coarse control provided by transmission 36 is sufficient. Therefore, in embodiments of the invention for such applications, continuously variable transmission 42 is not required.

Figure 3:
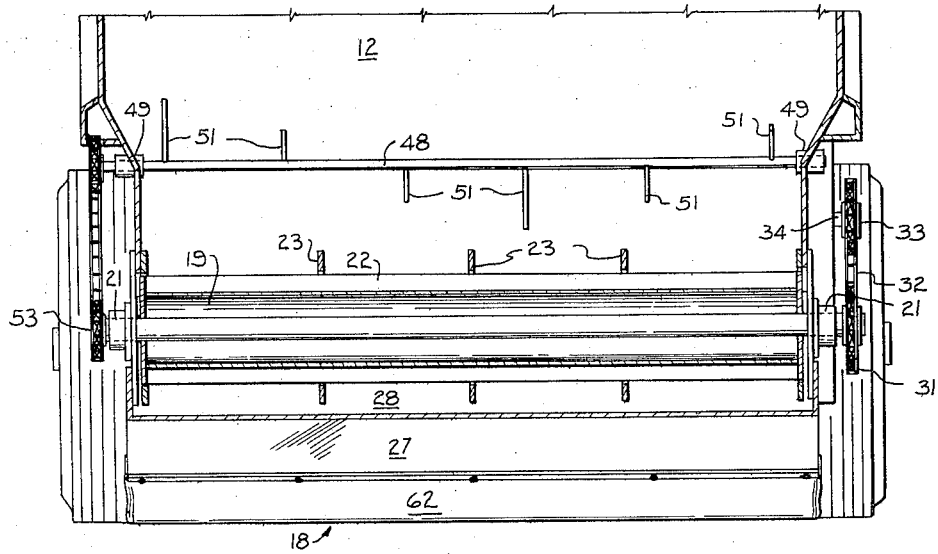
FIGURE 3 is a cross sectional view on an enlarged scale taken substantially in the plane indicated by the line 3—3 of FIGURE 1 and providing another view of the mixture forming and applying apparatus of the invention.

Means for agitating the powder within tank 12 to prevent it from packing and bridging therein adjacent drum 19 and from not being metered into chute 26 upon rotation of such drum is also provided. As best depicted in FIGURE 2 and 3, such agitation means includes two similar rods indicated by the reference numeral 48 extending transversely through containment tank 12 above and longitudinally of drum 19. Rods 48 are journalled for rotation in bearings 49, and have thin agitating blades 51 extending radially therefrom at spaced points therealong within the tank. As shown, blades 51 are of various lengths and are radially offset from one another. Further, the leading edges of the blades are sharpened. Because of these features of the blades, rotation thereof through the powder is facilitated and the tendency of the powder to block or stop the rotation of the blades is reduced.

Rods 48 are rotated by means of a chain 52 passing around a sprocket wheel 53 secured adjacent the end of drum 19 opposite that on which sprocket 31 is secured, and around sprockets 54 on the corresponding ends of the rods 48. Thus rotation of drum 19 to meter particulate material from tank 12 will result in rotation of rods 48 and consequent agitation of the material within the tank by blades 51. This agitation will obviate any tendency of the material to pack or bridge within the tank and not fall between slats 22 to be metered from such tank when drum 19 rotates. It is to be appreciated that the speed of rotation of rods 48 and, hence, the amount of agitation of the particulate material is directly dependent on the speed of rotation of drum 19. Thus, when drum 19 is rotating at a relatively fast rate to meter a relatively large amount of material into chute 26, rods 48 are also rotating at a relatively fast rate to assure that a large amount of powder is agitated and loose within tank 12 to be metered therefrom.

A liquid supply or pipe system is provided to introduce a liquid such as water to the material metered from tank 12 for the formation of a mixture of such material and the water as the material flows from chute slot 29. A main pipe 56 having a valve 55 extends from the rear of trailer 11 to a manifold 57 above and extending longitudinally of chute 26. Main pipe 56 is adapted at its rear end to be connected through a flexible hose with a similar pipe on the forward end of a conventional water supply trailer (not shown). Such water supply trailer can be suitably connected to the rear of trailer 11 by means of a coupling 58 and thus be pulled with such trailer 11 over surface 30.

As shown, a plurality of distributing pipes 59 are spaced at regular intervals along manifold 57 and terminate above top wall 28 of the chute. A splash shield 61 is rigidly connected above chute 26 and extends upwardly past the ends of pipes 59. Water entering main pipe 56 from the water supply trailer will flow into manifold 57 and from there through distributing pipes 59 onto top wall 28 of chute 26. Since there are a plurality of distributing pipes 59 and they are spaced at regular intervals above and along top wall 28, a generally even flow of water is obtained completely along top wall 28. Such water flows down wall 28 and into a flexible skirt 62, constituting an extension of chute 26, where it will mix with powder issuing from slot 29 to provide the desired mixture. Skirt 62 extends to surface 30 and has a rearwardly facing discharge opening 63 for applying the mixture onto the surface.

Water flowing from the edge of top wall 28 first contacts the upper portion of the powder issuing from slot 29. Therefore, depending upon the amount of water that is supplied to the powder, it is possible, if desired, to just wet the upper portion of the powder before it is discharged from skirt opening 63. Even in such an instance, however, no dust is created. The unwetted powder will be beneath the mixture and will not be able to escape into the atmosphere. Further, as is best depicted in FIGURE 2, skirt 62 "lays" the mixture onto the surface. Thus, no turbulence is created during the application to permit the escape of unwetted powder.

From the above, it is seen that a mixture of any desired consistency can be applied to the surface. The desired consistency can be simply obtained by regulating the proportionate flow of the material and the liquid into skirt 62. Since the mixture is formed simultaneously with its application to the surface, its viscosity does not appreciably affect its application to the surface.

It has been found that in the application of lime or cement to a surface, a paste consistency provides a dust free uniform layer of the material without the disadvantages associated with application of a slurry.

It is desirous to wet the surface 30 before the water powder mixture is applied thereto to further assure that no dust is created during the application of the mixture. For this purpose, a pipe 64 extends along the side of trailer 11 and connects manifold 57 with another manifold 66 which extends transversely of the trailer and forwardly of chute 26. A plurality of distribution pipes 67 depend from manifold 66 and are spaced at regular intervals therealong to provide an even flow of water to such surface 30. In order to control the amount of water supplied to manifold 66, a valve 68 is provided on pipe 64.

In many instances, it is desirous to add further liquid to the paste mixture after it has been applied to the surface. This is especially true when just the upper portion of the applied layer is wetted as it is applied to the surface. Pursuant thereto, another manifold 69 is connected by means of pipe 71 through a valve 72 to main water pipe 56. A plurality of distributing pipes 93 are spaced at regular intervals along manifold 69 and depend therefrom. Each of pipes 73 has a flexible conduit 74 such as of rubber attached to the free end thereof and extending downward to drag within the mixture on the surface 30 and to provide a rearwardly facing discharge nozzle therein. Because nozzles 74 drag through the applied layer, they form furrows therein. Thus water from such nozzles will flow into such furrows and be held therein sufficiently long to allow it to soak into the surrounding portion of the layer. This is advantageous over conventional methods where the water is applied directly to the top of the layer, because in such methods, the water tends to run off the layer before it sufficiently wets the powder.

To apply a uniform coating of a mixture onto a base surface with the apparatus of the invention, trailer 11 and a water trailer are filled with the desired powder and water, respectively, and towed to the surface to be coated by a suitable tractor. During such towing, transmission 36 is in neutral to prevent dispensing of powder from trailer 11, and valve 55 is closed. At the site of the surface, valve 55 is opened, and valves 68 and 72 adjusted to provide the desired rate of flow of water through pipes 67 to wet the surface, and through pipes 73 to add water to the mixture respectively. Valve 55 is then adjusted to give the desired flow of water through pipes 59 to form the mixture. Transmission 36 is set to the desired gear ratio and transmission 42 is adjusted to provide fine control of the amount of powder to be dispensed.

Trailer 11 and the water trailer are then towed along the surface to be coated. As trailer 11 is towed, water from distribution pipes 67 flows at uniform rate along the length thereof. From the chute such powder flows into skirt 62 whereat it mixes with water flowing from top wall 28 at a uniform rate along its length. A mixture of the desired consistency is thus formed as discussed above along the length of skirt 62, and such mixture flows from discharge opening 63 onto the surface substantially as it is formed. As mentioned before, the speed of rotation of drum 19 depends on the speed of rotation of tire 13 and, thus, such drum compensates for variations in the speed of trailer 11 by dispensing a variable amount of powder in order to assure that a uniform amount of powder is within the mixture over the whole of surface 30 regardless of such trailer speed variations. After the mixture is uniformly applied to the surface, water from distribution pipes 73 further dilutes it as desired.

While the invention has been described with reference to a preferred embodiment thereof, many variations are possible. For example, rather than a mixture of a material such as lime or cement being produced, a solution of material can be formed by the apparatus simultaneously with the application of such solution to a base surface. In addition, trailer 11 need not be of the semi-type but can be self-propelled, or a full trailer having front wheels.

What is claimed is:

1. Apparatus for dispensing a coating of a mixture of a particulate material and a liquid onto a base surface comprising a towable, wheeled trailer having a containment tank with a V-shaped bottom wall for a supply of said material, a rotatable drum extending transversely of said containment tank at the bottom of said V-shaped wall and having a plurality of longitudinally extending slats for metering material from said tank upon rotation of said drum, a chute extending longitudinally of said drum beneath said tank for receiving material metered from said tank and directing said material to said surface, motion transmittingly mechanism for selectively connecting said drum to a ground engaging wheel of said trailer to provide rotation of said drum and correlation of the speed of rotation of said drum with the speed of rotation of said wheel to provide a substantially uniform amount of said material onto said surface irrespective of variations in the speed of rotation of said wheel, and a pipe system on said trailer including a first plurality of liquid distribution pipes spaced longitudinally of said chute for directing a liquid uniformly thereacross to material issuing from said chute to form a mixture of said material and said liquid substantially simultaneously with the dispensing of said material from said apparatus, a second plurality of liquid distribution pipes equally spaced apart transversely of said trailer forwardly of said chute to uniformly wet the base surface ahead of said chute, and a third plurality of liquid distribution pipes equally spaced apart transversely of said trailer rearwardly of said chute, said latter distribution pipes having rearwardly facing discharge nozzles extending downward to drag within an applied coating on said surface and form liquid collecting furrows therein.

2. In apparatus for dispensing a mixture of a dry material and a liquid onto a base surface, comprising a ground engaging vehicle having a tank for a supply of said material, a generally enclosed chute extending from said tank and having an end portion adapted to be positioned adjacent said base surface, means for metering material from said tank for discharge through said chute onto said base surface, means for delivering liquid into said chute substantially uniformly across the width thereof to thereby provide a mixture of said material and said liquid, said mixture being confined within said chute until being discharged through the end portion of said chute.

3. Apparatus as set forth in claim 2 in which said chute extends for substantially the entire width of said tank.

4. Apparatus as set forth in claim 2 in which said end portion of said chute includes a flexible skirt adapted to engage said base surface.

5. Apparatus as set forth in claim 2 including means for delivering liquid substantially uniformly of the width of said chute rearwardly thereof and onto the mixture deposited by said chute onto said base surface.

6. Apparatus as set forth in claim 5 in which said last named means include a plurality of rearwardly facing discharge nozzles extending downwardly to drag within the applied mixture on the base surface and form liquid collecting furrows therein.

References Cited by the Examiner
UNITED STATES PATENTS

| | | | |
|---|---|---|---|
| 1,242,558 | 10/1917 | Johnston | 94—44 |
| 2,068,164 | 1/1937 | Cadwell | 94—23 |
| 2,241,863 | 5/1941 | Lett | 94—44 |
| 2,278,948 | 4/1942 | Rodli | 94—44 |
| 2,303,486 | 12/1942 | McConnaughay | 94—44 |
| 2,906,438 | 9/1959 | Carpenter | 94—44 X |
| 3,013,695 | 12/1961 | Caldwell | 94—44 X |

OTHER REFERENCES

Roads and Streets April 1953, page 81.
Roads and Streets, February 1948, pages 80, 81 and 82.

JACOB L. NACKENOFF, *Primary Examiner.*